March 7, 1933.   G. DE MONGE   1,900,165
POWER TRANSMISSION MECHANISM
Filed Dec. 23, 1927
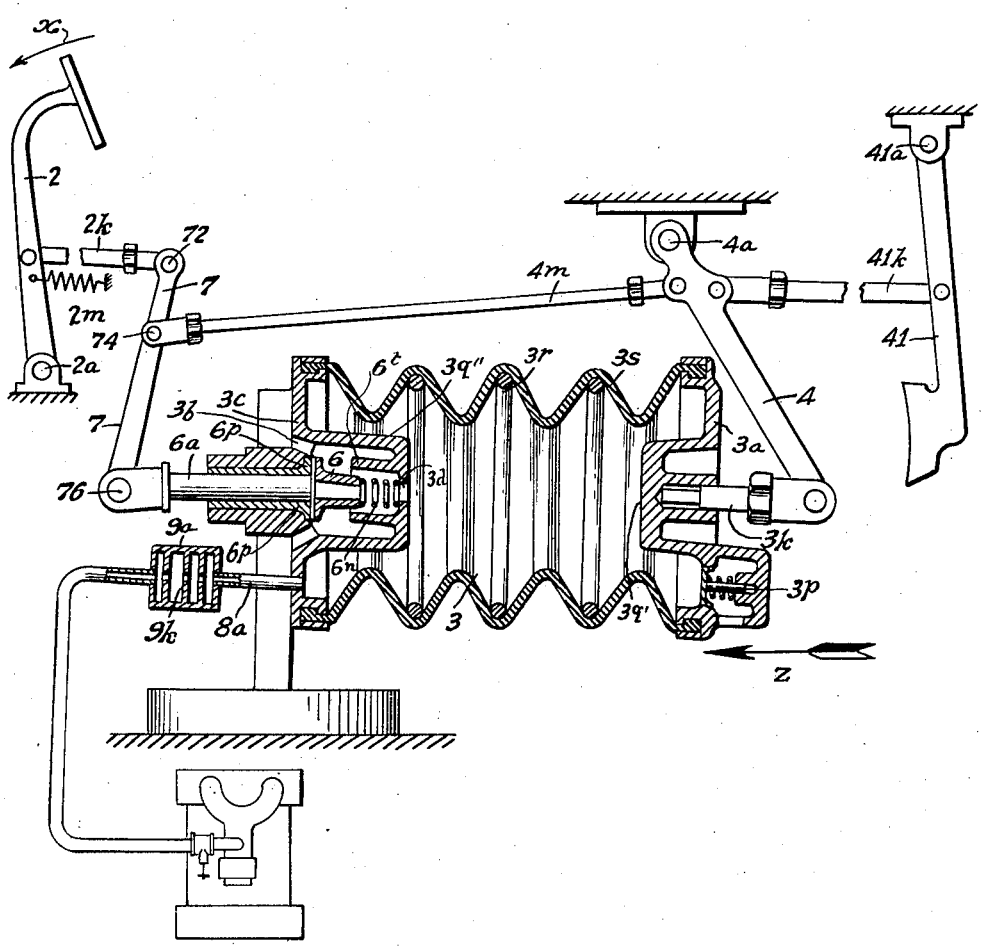
Inventor.
Gerard De Monge
By
Atty.

Patented Mar. 7, 1933

1,900,165

UNITED STATES PATENT OFFICE

GÉRARD DE MONGE, OF BRUSSELS, BELGIUM, ASSIGNOR TO FABRICA ITALIANA MAGNETI MARELLI, SOCIETA ANONIMA, OF MILAN, ITALY

POWER TRANSMISSION MECHANISM

Application filed December 23, 1927, Serial No. 242,178, and in Belgium December 30, 1926.

This invention relates to transmission mechanism; and especially to apparatus which comprises an actuating member and a member to be actuated thereby in conjunction with a source of auxiliary power; and which is particularly adapted for operating the brakes upon automobiles and other vehicles.

According to the invention, the actuated member is moved by an unbalanced force arising from variations in the volume of a suitable medium, and the latter is preferably enclosed in a bellows made of rubber or other flexible material. In practice the bellows is tubular with circumferential corrugations.

When the transmission mechanism operates the bellows contracts and the internal pressure becomes less than the external pressure. Hence to avoid collapse the material of which the bellows is made is reenforced; as by means of inside rings which are spaced apart at the proper distance, and to which the material constituting the bellows is secured.

The actuated member is moved either through a separate direct connection or through power from a convenient auxiliary source and the invention provides means for automatically superseding the effect of said auxiliary power when the action thereof lags relatively to the force exerted through the direct connection.

The actuating member is controlled so as to be returned to its position of rest in response to the force due to the auxiliary power, and the invention therefore provides means by which said member is subjected to an increasing reaction as the intensity of said force is enhanced.

By this invention, the action of the transmission mechanism is rendered quite gradual, for the actuating member is moved to a relatively large extent to cause the controlling means to vary only to a small degree the effect of the auxiliary power.

The present invention dispenses with the necessity of taking up lost motion before the actuated member is moved by the actuating member starting from its position of rest. To this end, when the actuating member is in its position of rest, the system, so far as the auxiliary power is concerned, becomes static.

This invention relates more particularly to a transmission system wherein the actuated member is united to both an actuating member by a positive connection, and a movable part of a chamber of variable volume. Said chamber is joined by means of a conduit to the intake or suction manifold of an internal combustion engine or other apparatus. A closure or valve device in a duct affording communication between the interior of said chamber and the atmosphere and controlled by the actuating member enables the pressure in said chamber to be reduced by creating a partial vacuum therein; and the difference between the pressure within the chamber and the atmospheric pressure on the outside of it generates the auxiliary power in the quantity desired.

A specific object of the invention is to provide means for relieving excess pressure in said chamber whenever the pressure therein rises to a value above atmospheric pressure; so as to facilitate the operation of the actuated member by the actuating member through the positive connection aforesaid.

A further object of the invention is to provide means in a transmission mechanism of the kind mentioned for enabling the degree of the partial vacuum in the chamber of variable volume to be increased or decreased at will so that the expenditure of the auxiliary power can be properly regulated.

Further objects and advantages of the invention will appear herein as the description proceeds; and the novel features will be pointed out in the appended claim. The right, however, is reserved to make any changes which are embraced within the principle of the invention and do not exceed its scope.

The drawing shows one embodiment of a transmission mechanism in accordance with this invention.

The actuating member is a pedal lever 2 which is pivoted at 2a and is drawn backwardly by a spring 2m and the actuated member is an arm 4 pivoted at 4a. This arrangement is well suited for motor vehicle brakes. The brake mechanism is represented by the lever 41 pivoted at 41a and connected to the actuated member 4 by the link 41k.

The source of auxiliary power is a chamber of variable capacity or volume 3 which is provided with a valve member 6 controlling a stream of air flowing towards a discharge pipe 8a which is connected for example, to the intake pipe of an internal combustion engine.

Through a floating lever 7 the operation of the valve 6 is made to depend upon the position of the actuated member 4. One end 72 of the said lever is connected to the actuating member 2 through a link 2k. The said member is also connected to the actuated member 4 by a further link 4m pivoted at 74 on the said lever the other end of which is connected at 76 to a plunger rod 6a by which the valve 6 can be impelled towards closed position.

The valve member 6 is movable relatively to an aperture 6t, in a boss 6c integral with the stationary end plate 3c of the chamber 3. This valve member has the form of a plug and is relatively long and tapers very gradually in the boss 6c so that the variation in the cross-sectional area of the air passage between the valve and the boss is very small for a relatively large displacement of the valve member 6 in relation to the aperture 6t.

The valve member is always urged away from the said aperture by a spring 6n in the boss 6c which therefore tends to operate the valve mechanism to reduce the effect of the auxiliary power. Thus the action of the auxiliary power is enchanced by increasing the displacement of the actuating member against the force of the spring 2m.

When the actuating member 2 is in its position of rest the valve member 6 under the action of the spring 6n abuts a stop formed by the end of a bearing 6p, receiving rod 6a. At this time air can flow freely into the chamber 3 and out by way of the pipe 8a, and in the line of this pipe may be an expansion chamber 9a containing baffle plates, perforated partitions or the like indicated at 9k to reduce the rate of flow of air in this pipe 8a. Of course, the same effect may be produced by constricting a portion of the pipe 8a to relative narrowness.

The chamber 3 is formed by bellows 3s shown in the drawing in longitudinal section. The bellows are assembled by clamping collars to two end plates 3a, 3c, the former being movable and connected by a rod 3k rigid therewith to the actuated member 4.

When the actuating member 2 is moved in the direction of the arrow x, the pull exerted on the link 2k is transmitted to the link 4m through the floating lever 7 and the rod 6a presses on the spring 6n through the valve member.

When the force of the lever 2 is sufficient to compress the spring 6n, the valve member 6 moves in the boss 6c to throttle the inflow of air which enters by way of an opening 3b in the end 3c and flows through the boss 6c by way of inlet port 3d into the bellows 3, with the result that the pressure in the chamber 3 is lowered so that the movable end plate 3a moves in the direction of the arrow Z together with the actuated member 4. Owing to the floating lever 7 which renders the operation of the valve 6 dependent on the movement of the lever 2 the displacement of the end plate 3a is limited by the amplitude of the movement imparted to the actuating member 2.

When the pull of the end plate 3a on the link 41k lags relatively to the pull exerted by the direct connection (link 4m) the pressure in the bellows 3 has a tendency to rise, but is prevented from exceeding atmospheric pressure by a valve member 3p fitted to one of the end walls of the chamber 3 and actuated by the difference in pressure between the interior of the chamber and outer air, so that the said valve member works after the fashion of a safety valve and opens when the pressure within the chamber tends to be higher than atmospheric.

The bellows 3s is reenforced by rings 3r which are placed inside at suitable intervals apart to prevent collapse of the walls thereof when the partial vacuum is created.

The end plates 3a and 3c are provided with bosses 3q' and 3q'', one of which moves towards the other when the bellows 3s is contracted by atmospheric pressure. The boss 3q' is affixed to the connection 3k and the other boss supports the boss 6c containing the spring 6n.

Owing to the reaction produced by compressing the spring 6n of the valve 6, the pressure to be exerted by the operator upon the member 2 increases in the proportion required for the effect of the auxiliary power to be increased. It must however be pointed out that more particularly when such effect is regulated by throttling air flowing towards the point of delivery of the pipe 8a, this effect does not depend only upon the extent to which the air is throttled but also upon the pressure prevailing in the intake conduit of the engine into which the pipe 8a discharges. When the relatively lower pressure in this intake conduit is produced by engine suction, the said pressure may vary with engine speed, so that when the present invention is applied to motor vehicles, this condition causes the braking action to decrease automatically with the speed of the vehicle without variation of the pressure put upon the actuating member 2.

The internal combustion engine is diagrammatically shown at E with the conduit 8a leading thereto.

The actuated member being pivoted about the point 4a, the bellows 3s has full freedom of movement in performing its function.

The said bellows is moreover sufficiently flexible, especially when made of rubber, to expand when inner pressure increases, so that it may act as a restoring force to return the parts to starting position.

While the invention is shown and described herein as employed in connection with the operation of brakes for vehicles, it may obviously be utilized for any other purpose requiring the transmission of power from one point to another.

What I claim is:

The transmission system comprising an actuated member, an actuating member, a direct connection between said members, means enclosing a chamber of variable volume having a movable end connected to the actuated member, means providing a conduit from said chamber to the intake of an internal combustion engine, said chamber also having communication with the atmosphere, a device for controlling said communication and connected to the actuating member, said device including a needle valve, a spring maintaining the valve normally open, a floating lever for actuating said valve against the spring, said lever forming part of the connection between said members, means in said conduit for influencing the suction of the engine therethrough and an automatic independently operating valve to vent said chamber.

In testimony whereof I have affixed my signature.

GÉRARD DE MONGE.